March 29, 1955  S. STRATY  2,704,848
APPARATUS FOR THREADING THE ENTIRE LENGTH OF A ROD
Filed May 25, 1950  2 Sheets-Sheet 1
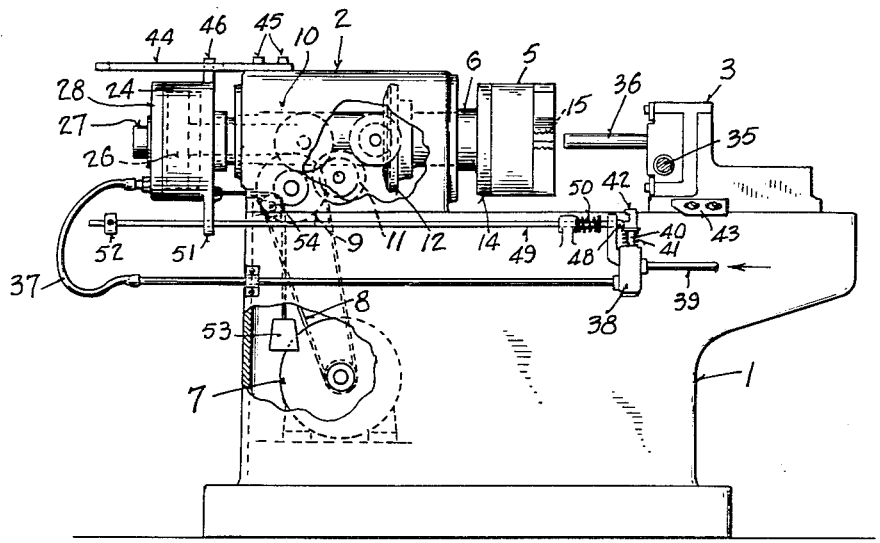
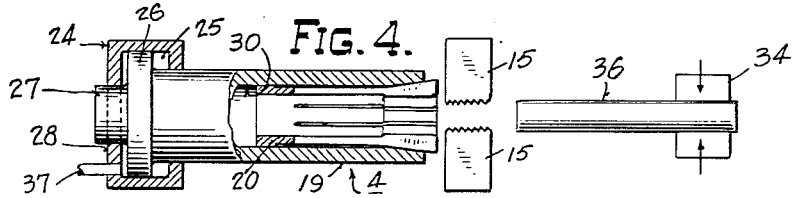
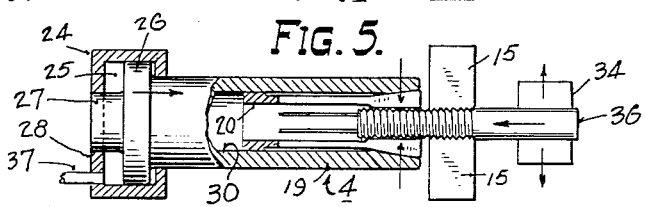
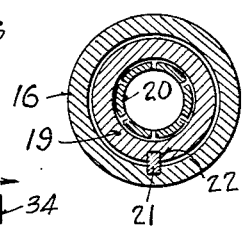
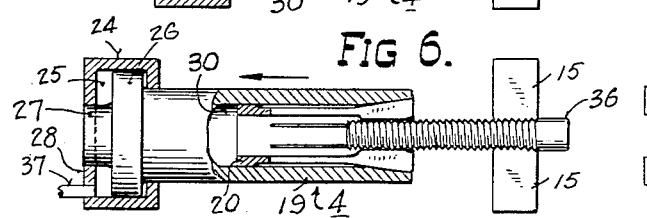
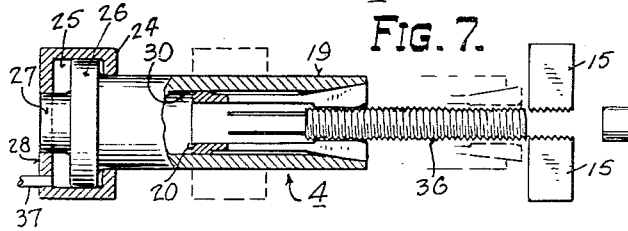
INVENTOR
Stephen Straty
BY
ATTORNEYS.

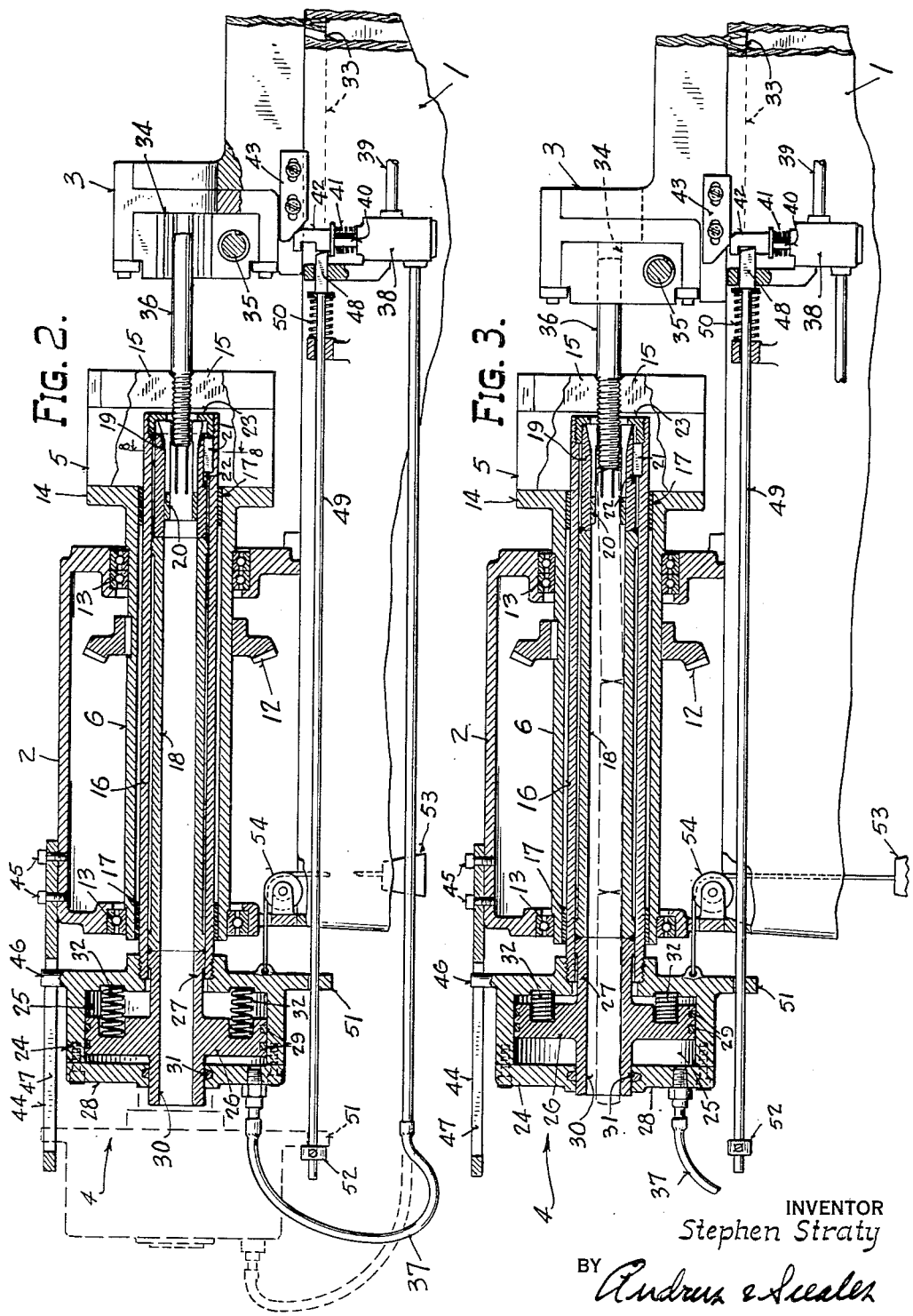

United States Patent Office 2,704,848
Patented Mar. 29, 1955

2,704,848

APPARATUS FOR THREADING THE ENTIRE LENGTH OF A ROD

Stephen Straty, Milwaukee, Wis., assignor to Kilbourn Engineering Company, Milwaukee, Wis., a corporation of Wisconsin Application May 25, 1950, Serial No. 164,205

12 Claims. (Cl. 10—89)

This invention relates to stud threading machines and particularly to machines adapted to continuously thread studs which are successively fed into the same.

One object of the invention is to provide a stud threading machine having two separate stud supporting and feeding means whereby, while one stud is being supported and fed within the cutting tool, a second stud is being positioned and fed by a second means to immediately follow the preceding stud into the cutting tool.

Another object of the invention is to coordinate the operation of two separate supporting and feeding means of a stud threading machine to provide a continuous support and feed for a stud whereby the transfer of the stud from one supporting means to the other is instantaneously accomplished without the necessity of interrupting the feed of the stud or changing the rate of that feed or the speed of the cutting means.

Another object is to make the support of the successively fed stud workpieces entirely independent of the cutting means whereby the latter can continue to function at a constant rate without regard to the progress of a stud as it passes through the machine.

Another object is to provide a continuous stud threading machine wherein the studs are at all times held against rotation to facilitate their transfer from one supporting means to another.

A further object of the invention is to provide in a stud threading machine a dual support for a stud workpiece whereby a stud may be fed past a rotary cutting tool into a hollow spindle and receive separate support against turning both without the spindle on the uncut side of the cutting tool and within the spindle on the completion side of the cutting tool, both separate supporting means being also independent of the cutting means itself.

Another object of the invention is to provide a stud threading machine having a hollow spindle and a stud supporting collet assembly operating within said spindle whereby the collet assembly and its actuating means are wholly disposed to the side of the spindle and head remote from the cutting tool to prevent its obstruction of or interference with the tool.

A further object of the invention is to provide a stud threading machine having a hollow spindle and a stud supporting collet assembly operating within said spindle wherein the entire collet assembly including its independent actuating means may be removed from the spindle without disturbing the spindle or other elements of the machine associated therewith including the die head and cutting tools, such ready removal being adapted to facilitate repair of the collet assembly and to permit interchange of assemblies.

These and other objects and advantages of the invention will be more fully set forth in the following description of a preferred embodiment of the invention illustrated in the accompanying drawings.

In the drawings:

Figure 1 is a side elevation of the stud threading machine with parts broken away to show the motor and gear transmission driving the spindle;

Fig. 2 is a side elevation of a part of the machine showing the upper portion of the bed, the headstock, collet assembly, and carriage, parts thereof being broken away and sectioned;

Fig. 3 is a side elevation similar to that of Fig. 2 but showing the collet assembly, carriage, and related actuating mechanism in different operating positions;

Figs. 4 to 7 are diagrammatic views showing the cutting chasers, collet assembly, carriage, and one or more studs in various working positions during the cycle of operation; and Fig. 8 is a transverse section taken on line 8—8 of Fig. 2 and showing the key stop for the collet.

The stud threading machine illustrated comprises a bed 1, a headstock 2, a carriage or slide 3, a collet assembly generally designated as 4 and a die head 5 rotatably secured to a hollow spindle 6.

Referring to Fig. 1, the spindle 6 of headstock 2 is driven by a motor 7 supported within bed 1. Power is transmitted through belt 8 from motor 7 to input sheave 9. Sheave 9 is mounted on a drive shaft extending into a gear box 10 provided as part of headstock 2.

The gear box 10 contains a suitable gear train 11 connected with a bevel gear 12 which is fixed upon spindle 6 within headstock 2. Train 11 may have associated with it shifting mechanism (not shown) necessary to provide satisfactory changes of speeds and reversal of operating direction of the spindle.

The hollow spindle 6 is rotatably supported within headstock 2 by bearings 13 disposed at opposite ends of the headstock. The forward end of spindle 6 is formed with an annular mounting flange 14 to receive the die head 5 which is secured thereto.

Die head 5 carries threading chasers 15 at the outer end, which along with the die head continuously rotate with the spindle 6 during operation of the machine.

Within hollow spindle 6 and extending both forwardly thereof to within die head 5 and rearwardly to without the spindle is the collet assembly 4.

That portion of collet assembly 4 which extends within spindle 6 and head 5 is enclosed in a hollow tube 16 concentric with spindle 6 and mounted for free relative rotation between it and the spindle and die head upon bearings 17, disposed at opposite ends of the spindle.

Hollow tube 16 encloses a pusher sleeve 18 which extends substantially the entire length of spindle 6, a collet closing sleeve 19 aligned with and extending forwardly of pusher sleeve 18, and a collet ring member 20 disposed within the forward end of closing sleeve 19 slightly to the rear of chasers 15.

Closing sleeve 19 is fixed against rotational movement relative to hollow tube 16 by a key 21 fixed on said tube and disposed in keyway 22 of sleeve 19 for free longitudinal movement of said sleeve.

The forward inner wall of closing sleeve 19 and the forward outer wall of collet ring 20 are formed with complementary tapered frusto-conical engaging surfaces whereby the forward movement of sleeves 18 and 19 contracts ring 20 to grip a stud workpiece, and their rearward movement permits expansion of the ring 20 and release of the stud. Collet ring 20 is held against rotation relative to sleeves 18 and 19 and hollow tube 16 by the gripping of sleeve 19 upon the same.

Collet ring 20 is held within the forward end of closing sleeve 19 by flanged nut 23 threaded into the inner wall of enclosing tube 16. The gripping pressure of ring 20 upon the work may be varied by adjusting nut 23 to desired longitudinal positions.

An enlarged portion of collet assembly 4 to the rear of spindle 6 and headstock 2 is provided by a cylindrical casing 24. Casing 24 is threaded to the rear end of hollow tube 16 extending beyond the headstock 2.

Casing 24 provides a cylinder chamber 25 for hydraulic piston 26 disposed concentric with spindle 6 and having a hollow inner bore substantially the same as that of pusher sleeve 18 and closing sleeve 19. Piston 26 has annular hub portion 27 extending forwardly to within tube 16 and which engages the end of pusher sleeve 18 whereby forward movement of the piston 26 will be imparted to the sleeves 18 and 19. The rear end of member 27 extends outwardly through the head 28 of cylinder 24.

The piston 26 has an outer diameter substantially equal to the inner diameter of casing 24. A fluid seal is provided between the piston 26 and casing 24 by piston rings 29 mounted on the outer surface of the piston.

The entire piston 26 and its member 27 is provided with an axial opening 30 therethrough of a diameter corresponding to the inside diameter of sleeves 18 and 19. A seal ring 31 is provided between the rear end of member 27 and the cylinder head 28.

The piston 26 is normally biased against the rear of cylinder chamber 25 by circumferentially spaced piston springs 32 extending longitudinally between the piston and the forward wall of casing 24.

The taper on the collet should be sufficiently steep to prevent locking of the collet in gripping position, so that when piston 26 is forced by springs 32 to the rear of chamber 25, as shown in Fig. 2, the pusher and closing sleeves 18 and 19 will be forced to follow rearwardly with respect to their enclosing tube 16 as the collet ring 20 expands to release its grip on a stud. Forward movement of piston 26 within chamber 25 causes the sleeves 18 and 19 to compress and close collet ring 20 as a result of engagement between the tapered surfaces of closing sleeve 19 and ring 20.

Each stud is initially carried by the carriage 3 to the die head 5. Carriage 3 may be manually or automatically driven as desired.

Carriage 3 is mounted for longitudinal movement on ways 33 in the bed 1. It has mounted thereon a vise clamp 34 which may be opened and closed by a screw 35 operated by a lever, hand wheel or other means (not shown).

In operation, a stud 36 is supported at one end against rotation in clamp 34 so that it extends outwardly from the clamp towards die head 5. The carriage is then moved towards headstock 2 until the stud 36 is fed into rotating chasers 15. As carriage 3 continues toward headstock 2 threads are formed on a portion of the non-roating stud 36, and the threading action of the chasers 15 assists in the feed of the stud and the movement of carriage 3.

To this point the collet ring 20 has remained expanded due to the biasing action of springs 32 upon piston head 26.

To permit the transfer of the partially threaded stud 36 to the collet ring 20, fluid is admitted to the rear of chamber 25 to oppose the action of springs 32. Such fluid is admitted to chamber 25 through a flexible tubing 37 connected at one end to chamber 25 and at the other end to a valve 38 disposed near the top of bed 1 slightly below one of the ways upon which the carriage 3 travels.

Fluid is supplied to valve 38 under pressure through an inlet pipe 39 from a supply source (not shown). The valve has a stem 40 extending upwardly therefrom and is normally biased to closed position by a spring 41.

The upper portion of valve stem 40 is formed with a trip 42 which is forced by spring 41 into the path of a cam plate 43 adjustably mounted on carriage 3. The cam 43 is disposed to engage and depress the trip 42 when the carriage 3 has reached a point in its travel where the threaded portion of the stud 36 has entered the collet ring 20 of collet assembly 4. The parts are shown at the described positions in Fig. 2.

When the trip 42 is depressed by the cam 43, fluid is admitted through valve 38 and tubing 37 to chamber 25 of collet assembly 4 and the piston 26 is moved to the position shown in Fig. 3 moving with it the sleeves 18 and 19 which in turn cause collet 20 to contract about the threaded portion of stud 36. At this time the carriage 3 and its clamp 34 are free to release the stud 36 and return for a second stud to be successively fed into the chasers 15 when the threading of stud 36 has been completed.

While gripped by collet ring 20, the stud continues to be held against rotation and the rotating chasers 15 continue to cut threads on the stud and to feed the stud rearwardly in the spindle.

The entire tube 16 with its collet assembly 4 and the cylinder 24 are held against rotation by a pilot bar 44 rigidly anchored to the headstock 2 by bolts 45 and extending rearwardly from the headstock to provide a guide for the cylindrical casing 24. Casing 24 has formed at the top thereof a bearing lug 46 which slidably engages an elongated slot 47 in the pilot bar 44. As the tube 16, ring 20, and sleeves 18 and 19 are all rotationally fixed relative to casing 24, the pilot bar 44 prevents rotation of the entire collet assembly 4.

To prevent the release of studs by collet ring 20 before threading has been completed, the valve stem 40 and its trip 42 are held in a depressed open position by a latch 48 carried on rod 49, the latter extending rearwardly the length of the machine. Rod 49 and its latch 48 are normally biased forwardly towards trip 42 by a spring 50. Referring to Fig. 3, as carriage 3 passes over and depresses trip 42, latch 48 is urged into a notch formed in trip 42 to hold it in a depressed position whereby fluid pressure is maintained in cylinder chamber 25 though the cam 43 on carriage 3 has moved away from the valve members in its return to pick up another stud.

While stud 36 is gripped by collet ring 20 and its threading is being completed, the rotating chasers 15 automatically feed the stud rearwardly, and the entire collet assembly 4 travels with the stud to the position shown in dotted lines in Fig. 2 for cylinder 24..

At a predetermined moment when the stud 36 has been completely threaded, a bearing lug 51 formed at the bottom of casing 24 and embracing the longitudinally extending rod 49 engages an adjustable stop collar 52 secured at the rear end of rod 49. The rearward movement of casing 24 causes the rod 49 to withdraw its latch 48 from engagement with trip 42, and the valve stem 40 is free to raise under the biasing of spring 41, thereby closing its valve and cutting off pressure supply to cylinder chamber 25 and opening the same to exhaust. Such pressure cut-off permits the piston springs 32 to force piston head 26 again to the rear of chamber 25 and collet ring 20 releases the stud.

Having released the stud, collet assembly 4 is free to return to its original position shown in Fig. 2 and such return is effected by a counterweight 53 secured to the forward end of casing 24. The cord of weight 53 is supported by a pulley 54 in the head-stock 2 and extends downwardly into bed 1.

While collet assembly 4 has performed its working cycle, carriage 3 has returned to die head 5 with a second stud. The successive alternate gripping operations of carriage 3 and collet assembly 4 may be readily coordinated whereby a single stud is held against rotation and continuously being threaded by chasers 15. The threaded studs are free to travel through the hollow sleeves 18 and 19 and the inner bore 30 of piston 26 and are discharged at the rear of the machine being pushed by succeeding studs as they are threaded.

Figures 4 through 7 diagrammatically illustrate various positions of collet assembly 4, the carriage clamp 34 and the studs 36 during the working cycles relative to the fixed position of the chasers 15. Arrows indicate jaw positions and the direction of travel of the moving members.

Fig. 4 shows the elements just prior to the entry of an initial stud into the chasers 15.

Fig. 5 shows the same elements as positioned after the initial stud has entered the chasers 15 where it has been partially threaded and at the moment when the collet ring 20 has first gripped the stud.

Fig. 6 shows the elements in intermediate positions while the stud is being carried by the collet assembly 4 and as the carriage 3 returns for a second stud.

Fig. 7 shows the collet assembly disposed at the rearward limit of its stroke at the completion of the threading of the initial stud and ready to release the stud. Clamp 34 is shown in a posiion about to feed a second stud into the chasers 15. Dotted lines indicate the position the assembly 4 will promptly assume when it has released the initial stud and has returned preparatory to the transfer to it of the second stud.

The machine is also well adapted to use with a single workpiece of substantially greater length than those illustrated. Under such conditions the long workpiece would be continuously supported by either the carriage 3 or the collet assembly 4, each of them periodically and alternately taking new grips upon the work as their cycles of operation are repeated.

The collet assembly 4 may be readily removed from the machine as a unit by detaching the flexible tubing 37 from the rear of casing 24, removing the adjustable stop collar 52 from the rod 49 and sliding the entire assembly 4 along rod 49 and pilot bar 44 to without the rear of the machine.

The alternate gripping of the workpiece 36 by the chuck 34 in carriage 3 and the collet chuck 4 in spindle 6 will retain the workpiece against rotation with chasers 15 at all times. The gripping periods of chucks 34 and 4 may overlap to any extent desired. After initial entry of the workpiece 36 into chasers 15, the axial movement of the workpiece is governed by the threading action of the chasers thereon.

In the construction shown, carriage 3 and chuck 34 constitute the initial feeder for the workpiece. The machine may be constructed to feed the workpiece through the spindle to chasers 15, if desired, by merely constituting the collet assembly 4 as the initial feeder for the workpiece.

Various embodiments of the invention may be employed within the scope of the following claims.

I claim:

1. A machine for continuous threading of a workpiece from end to end, comprising a hollow spindle, rotary thread chasers mounted on the hollow spindle, a non-rotary feeder mounted adjacent one side of the chasers and operated to chuck the workpiece and to initially feed the workpiece axially to the chasers and to hold the workpiece against turning in the chasers, a second non-rotary chucking means disposed on the opposite side of said chasers from said feeder to receive the threaded workpiece as the workpiece progresses axially through the chasers, and means actuated by said feeder upon threading of a predetermined length of the workpiece to operate said second chucking means and grip the threaded end of the workpiece whereby the workpiece may be moved continuously through the chasers and held against rotation at all times by said feeder and chucking means acting in succession.

2. A machine for continuous threading of a workpiece from end to end, comprising a hollow spindle, rotary thread chasers mounted on the hollow spindle, a non-rotary feeder mounted adjacent one side of said chasers and operated to chuck the workpiece and to initially feed the workpiece axially to the chasers and to hold the workpiece against turning in the chasers, a collet ring disposed on the opposite side of said chasers axially of said feeder to receive a threaded workpiece as the same progresses axially through the chasers, a non-rotary tubular enclosure around said collet ring and interlocked therewith to prevent rotation of the same, means carried by said tubular enclosure to effect gripping of the threaded workpiece by said collet ring, and means actuated by said feeder upon threading of a predetermined length of the workpiece to operate said last-named means to grip the threaded end of the workpiece whereby the workpiece may be moved continuously through the chasers and held against rotation at all times by said feeder and collet ring active in succession.

3. A machine for continuous threading of a workpiece from end to end, comprising a hollow spindle, rotary thread chasers mounted on the hollow spindle, a feeder mounted on the machine in axial alignment with the chasers and operated to chuck the workpiece and to initially feed the workpiece axially to the chasers and to hold the workpiece against turning in the chasers, a tubular sleeve mounted for free axial movement within said hollow spindle on the opposite side of said chasers from said feeder, a second chucking means disposed within said tubular sleeve at the chaser end thereof and secured against rotation relative to the sleeve, means to prevent rotation of said tubular sleeve, and means on said sleeve to effect gripping of the threaded portion of a workpiece by said second chucking means upon a predetermined advance movement of said feeder, said second chucking means being adapted to move axially with said sleeve in said hollow spindle and away from the chasers, whereby the tubular sleeve and second chucking means continue to hold the workpiece against rotation and are fed by said chasers to support the workpiece within the hollow spindle.

4. A machine for continuous threading of a workpiece from end to end, comprising a hollow spindle, rotary thread chasers mounted on the hollow spindle, a feeder mounted on the machine axially of the spindle on one side of the chasers and operated to chuck the workpiece and to initially feed the workpiece axially to the chasers and to hold the workpiece against turning in the chasers, a non-rotating tubular sleeve mounted for axial movement within said hollow spindle on the opposite side of said chasers from said feeder, a collet ring having a tapered outer surface mounted within said tubular sleeve and held against axial movement relative thereto, a hollow closing tube disposed within said tubular sleeve and around said collet ring and having a tapered inner surface complementary to the taper of said collet ring whereby axial movement of said closing tube in one direction effects gripping of said collet ring upon the workpiece, and means to effect axial movement of said collet closing tube relative to said tubular sleeve to clamp the collet ring to the threaded workpiece upon a predetermined advance movement of said feeder, said collet ring being adapted to move axially away from the chasers with said tubular sleeve, whereby the workpiece may be moved continuously through the chasers and held against rotation at all times by either said feeder or said collet ring active in succession.

5. A machine for continuously threading a workpiece from end to end, comprising a base, a headstock having a hollow spindle, rotary thread chasers mounted forwardly of the headstock on the hollow spindle, a feeder mounted on a longitudinal slide on said base axially of the chasers and operated to chuck the workpiece and to feed the same axially to the chasers and to hold the workpiece against turning in the chasers, a second chucking means disposed within said hollow spindle on the opposite side of said chasers from said feeder to receive the threaded workpiece as the workpiece progresses axially through the chasers, said chucking means having a tapered surface, a hollow enclosure encircling said second chucking means and mounted for free axial movement within said spindle and extending rearwardly to without said headstock, said enclosure having a tapered inner surface at the inner end complementary to the tapered surface of the chucking means, means for securing said enclosure against rotation, a hydraulic piston mounted for axial movement within said enclosure and connected with said second chucking means to move the second chucking means against the tapered surface of the hollow enclosure and clamp the chucking means to the workpiece, and means actuating said piston upon a predetermined advance movement of said feeder, whereby the enclosure and second chucking means hold the workpiece against rotation and are fed therewith by said chasers to support the workpiece within the spindle and headstock.

6. In a machine for continuously threading a workpiece from end to end and having a headstock, a hollow spindle mounted within the headstock for rotation therein, rotary thread chasers mounted on the spindle forwardly of the headstock, a chuck assembly for supporting a workpiece within said spindle and headstock and comprising a hollow enclosure for said assembly mounted for free axial movement within said spindle and extending rearwardly to without said headstock for withdrawal from the rear of the headstock without interference with said chasers, said enclosure having a tapered inner surface at the inner end means for securing said enclosure against rotation, a collet ring disposed in the forward portion of said enclosure to receive a threaded workpiece as the same progresses axially through the chasers, said ring having a tapered outer surface at the forward end thereof, a hydraulic piston mounted for axial movement within said enclosure and connected with said collet ring, and means for actuating said piston within said enclosure upon threading of a predetermined length of the workpiece to force the tapered ring portion against the taper of the enclosure for closing the ring to effect gripping of the workpiece, whereby the enclosure and collet ring hold the workpiece against rotation and are fed therewith by said chasers to support the workpiece within the spindle and headstock.

7. In a machine for continuously threading a workpiece from end to end and having a headstock, a hollow spindle, and rotary thread chasers mounted on the spindle forwardly of the headstock, a chuck assembly for supporting a workpiece within said spindle and headstock, comprising a hollow enclosure for said assembly mounted for free axial movement within said spindle and extending rearwardly to without said headstock whereby the entire assembly may be readily withdrawn from the rear of the headstock without interference with said chasers, means for securing said enclosure against rotation, a collet ring having a tapered outer surface mounted within the forward portion of said enclosure to receive a threaded workpiece as the same progresses axially through the chasers, an abutment in said enclosure preventing axial movement of said collet in one direction, a hollow closing tube disposed within said enclosure rearwardly of and in axial alignment with said collet ring and having a tapered inner surface complementary to the taper of said collet ring whereby axial movement of said closing tube in a direction toward said abutment effects gripping of said collet ring, and means to effect axial movement of said pusher tube relative to said enclosure to effect gripping of a threaded workpiece by said collet ring whereby the enclosure and collet ring hold the workpiece against rotation and are fed therewith by said chasers to support the workpiece within the spindle and headstock.

8. In a machine for continuously threading a workpiece from end to end and having a headstock, a hollow spindle, and rotary thread chasers mounted on the spindle forwardly of the headstock, a chuck assembly for supporting a workpiece within said spindle and headstock, comprising a hollow enclosure for said assembly mounted for free axial movement within said spindle and extending rearwardly to without said headstock whereby the entire assembly may be readily withdrawn from the rear of the headstock without interference with said chasers, means for securing said enclosure against rotation, a collet ring having a tapered outer surface mounted within the forward portion of said enclosure to receive a threaded workpiece as the same progresses axially through the chasers, an abutment in said enclosure preventing axial movement of said collet in one direction, a hollow closing tube disposed within said enclosure rearwardly of and in axial alignment with said collet ring and having a tapered inner surface complementary to the taper of said collet ring whereby axial movement of said closing tube in a direction toward said abutment effects gripping of said collet ring, and a hydraulic piston mounted for axial movement within said enclosure to effect axial movement of said pusher tube relative to said enclosure to effect gripping of a threaded workpiece by said collet ring whereby the enclosure and collet ring hold the workpiece against rotation and are fed therewith by said chasers to support the workpiece within the spindle and headstock.

9. In a machine for continuously threading a workpiece from end to end and having a headstock, a hollow spindle, and rotary thread chasers mounted on the spindle forwardly of the headstock, a chuck assembly for supporting a workpiece within said spindle and headstock, comprising a hollow enclosure for said assembly mounted for free axial movement within said spindle and extending rearwardly to without said headstock whereby the entire assembly may be readily withdrawn from the rear of the headstock without interference with said chasers, means for securing said enclosure against rotation, a collet ring having a tapered outer surface mounted within the forward portion of said enclosure to receive a threaded workpiece as the same progresses axially through the chasers, an abutment in said enclosure preventing axial movement of said collet in one direction, a hollow closing tube disposed within said enclosure rearwardly of and in axial alignment with said collet ring and having a tapered inner surface complementary to the taper of said collet ring whereby axial movement of said closing tube in a direction toward said abutment effects gripping of said collet ring, and means actuated upon threading of a predetermined length of the workpiece to effect axial movement of said closing tube relative to said enclosure to effect gripping of a threaded workpiece by said collet ring whereby the enclosure and collet ring hold the workpiece against rotation and are fed therewith by said chasers to support the workpiece within the spindle and headstock, the taper of said collet being disposed at an angle which effects automatic opening of the collet and retraction of said hollow tube upon release of said last named means.

10. In a machine for continuously threading a workpiece from end to end and having a headstock, a hollow spindle, and rotary thread chasers mounted on the spindle forwardly of the headstock, a chuck assembly for supporting a workpiece within said spindle and headstock, comprising a hollow enclosure for said assembly mounted for free axial movement within said spindle and extending rearwardly to without said headstock whereby the entire assembly may be readily withdrawn from the rear of the headstock without interference with said chasers, means for securing said enclosure against rotation, a collet ring having a tapered outer surface mounted within the forward portion of said enclosure to receive a threaded workpiece as the same progresses axially through the chasers, an abutment in said enclosure preventing axial movement of said collet in one direction, a hollow closing tube disposed within said enclosure rearwardly of and in axial alignment with said collet ring and having a tapered inner surface complementary to the taper of said collet ring whereby axial movement of said closing tube in a direction toward said abutment effects gripping of said collet ring, and a hydraulic piston mounted for axial movement within said enclosure to effect axial movement of said closing tube relative to said enclosure, said piston being actuated upon threading of a predetermined length of the workpiece to effect gripping of a threaded workpiece by said collet ring whereby the enclosure and collet ring hold the workpiece against rotation and are fed therewith by said chasers to support the workpiece within the spindle and headstock, the taper of said collet being disposed at an angle which effects automatic opening of the collet and retraction of said hollow tube upon release of said piston.

11. A machine for continuously threading a workpiece from end to end, comprising a base, a headstock having a hollow spindle, rotary thread chasers mounted forwardly of the headstock on the hollow spindle, a feeder mounted on a longitudinal slide on said base axially of the chasers and operated to chuck the workpiece and to feed the same axially to the chasers and to hold the workpiece against turning in the chasers, a second chucking means disposed within said hollow spindle on the opposite side of said chasers from said feeder to receive the threaded workpiece as the workpiece progresses axially through the chasers, said chucking means having a tapered surface, a hollow enclosure encircling said second chucking means and mounted for free axial movement within said spindle and extending rearwardly to without said headstock, said enclosure having a tapered inner surface at the inner end complementary to the tapered surface of the chucking means, means for securing said enclosure against rotation, a hydraulic piston mounted for axial movement within said enclosure and connected with said hollow enclosure to move the hollow enclosure against the tapered surface of the second chucking means and clamp the chucking means to the workpiece, means responsive to the forward movement of said feeder to actuate said piston, stop means to limit the axial movement of said second chucking means and to release said means, and means biasing said second chucking means axially toward said chasers for return of said chucking means following release thereof from the workpiece, whereby the enclosure and second chucking means hold the workpiece against rotation and are fed therewith by said chasers to support the workpiece within the spindle and headstock, the taper of said collet being disposed at an angle which effects automatic opening of the collet and retraction of said hollow tube upon release of said piston.

12. A machine for continuously threading a workpiece from end to end, comprising a base, a headstock having a hollow spindle, rotary thread chasers mounted forwardly of the headstock on the hollow spindle, a feeder mounted on a longitudinal slide on said base axially of the chasers and operated to chuck the workpiece and to feed the same axially to the chasers and to hold the workpiece against turning in the chasers, a second chucking means disposed within said hollow spindle on the opposite side of said chasers from said feeder to receive the threaded workpiece as the workpiece progresses axially through the chasers, said chucking means having a tapered surface, a hollow enclosure encircling said second chucking means and mounted for free axial movement within said spindle and extending rearwardly to without said headstock, said enclosure having a tapered inner surface at the inner end complementary to the tapered surface of the chucking means, means for securing said enclosure against rotation, a hydraulic piston mounted for axial movement within said enclosure and connected with said hollow enclosure to move the hollow enclosure against the tapered surface of the second chucking means and clamp the chucking means to the workpiece, whereby the enclosure and second chucking means hold the workpiece against rotation and are fed therewith by said chasers to support the workpiece within the spindle and headstock, the taper of said second chucking means being disposed at an angle which effects automatic opening of the second chucking means and retraction of said hollow enclosure upon release of said piston, means to admit pressure fluid to actuate said piston upon a predetermined movement of said feeder, means to lock said last named means to permit retraction of said feeder and maintenance of said piston actuation, and means to release said lock upon a predetermined axial movement of said second chucking means to discontinue said pressure fluid passing to said piston and effect a release of the piston whereby said collet by reason of its resilience releases its grip upon the workpiece.

References Cited in the file of this patent

UNITED STATES PATENTS

| | | | |
|---|---|---|---|
| 394,661 | Parsons | Dec. 18, | 1888 |
| 1,830,027 | Hayden | Nov. 3, | 1931 |
| 1,973,801 | Dustan | Sept. 18, | 1934 |
| 2,262,178 | Gest | Nov. 11, | 1941 |
| 2,289,167 | Bannister | July 7, | 1942 |
| 2,392,999 | Redmer | Jan. 15, | 1946 |
| 2,427,322 | Darner | Sept. 9, | 1947 |
| 2,477,773 | Soussloff et al. | Aug. 2, | 1949 |